Patented July 29, 1941

2,250,508

UNITED STATES PATENT OFFICE 2,250,508

TREATING ZINC WITH ORGANIC ACIDS

John S. Thompson and Edward S. Hanson, Detroit, Mich.

No Drawing. Application June 15, 1936, Serial No. 85,335. Renewed January 20, 1939

15 Claims. (Cl. 148—6)

This invention relates to the field of chemically treating metal surfaces. More particularly, it has to do with the coating of zinc surfaces for the purpose of increasing the corrosion resistance thereof and to assist said surface in retaining siccative coatings such as paints, lacquers, enamels and the like.

In the past, several organic acids have been used for the purposes aforesaid, including acids taken from the groups of dicarboxylic and hydroxydicarboxylic acids of the aliphatic series, and also carboxylic acids with one carboxyl group and sulfonic acids of the aromatic series.

It has been discovered that beneficial treatments of zinc surfaces are obtained by subjecting the metallic surfaces to the action of solutions containing one or more of the following groups of acids and mixtures:

1. Aromatic series of acids having two carboxyl groups.
2. Mono-carboxylic acids of the aliphatic series.
3. Tri-carboxylic acids of the aliphatic series.
4. Hydroxy mono-carboxylic acids of the aliphatic series.

The following examples are given with the intention of illustrating the invention and not by way of limitation.

*Example 1.*—A 2½% solution of phthalic acid containing 1% ferric sulfate will produce a black coating on zinc surfaces in four minutes at boiling temperature. The addition of ½% sodium nitrate produces a gray coating on zinc surfaces in three minutes at boiling temperature.

*Example 2.*—A 2½% solution of formic acid containing 1% ferric sulfate coats zinc surfaces in five minutes at boiling temperature. The same solution plus ½% sodium nitrate produces a hard reddish coating on zinc at room temperature in five minutes.

*Example 3.*—A 2½% solution of acetic acid containing 1% ferric sulfate and ½% sodium nitrate produces a hard yellow coating on zinc in five minutes at room temperature. The same solution when used at boiling temperature produces a heavy gray coating.

*Example 4.*—A 2½% solution of propionic acid containing 1% ferric sulfate will coat zinc in three minutes at boiling temperature. The same solution containing ½% sodium nitrate produces a black coating on zinc in three minutes at room temperature.

*Example 5.*—A 2½% solution of citric acid containing ½% ferric sulfate produces a black coating on zinc in two minutes at boiling temperature. When ½% sodium nitrate is added to this solution a coating composed principally of oxides is formed in five minutes at room temperature. At boiling temperature this solution produces a coating composed principally of citrates in five minutes.

*Example 6.*—A 2½% solution of glycollic acid containing 1% ferric sulfate produces a smudgy black coating on zinc in four minutes at room temperature. The same solution when used at boiling temperature produces a hard black coating in three minutes. When ½% sodium nitrate is added to the solution a good gray coating results in three minutes at boiling temperature.

*Example 7.*—A 2½% solution of mandelic acid containing 1% ferric sulfate produces a gray coating in ten minutes at boiling temperature. The same solution with the addition of ½% sodium nitrate produces a gray coating in 15 minutes at room temperature. The latter solution produces a hard gray coating in four minutes when used at boiling temperature.

It will be understood that coatings on zinc surfaces may be obtained with one of three combinations: First, with one of the acids in the above listed groups and an oxidizing agent; second, one of the acids contained in the groups listed above and a metal accelerator; third, one of the acids contained in the groups listed above, a metal accelerator and an oxidizing agent.

It will be readily understood that because of the reaction that takes place between strong oxidizing agents and some organic acids the oxidizing agents suitable for use in these combinations are necessarily limited to those which do not readily oxidize the acid being used. Among the suitable oxidizing agents are nitrates, nitrites and bromates such as sodium nitrate, zinc nitrate, sodium nitrite and sodium bromate.

It has also been discovered that a number of metals act as accelerators in these solutions. The metals may be added to the solutions in the form of soluble salts or compounds and it seems to be immaterial what salts are used. Metals which act as accelerators in these solutions include iron, antimony, zinc, arsenic, cobalt, copper, nickel and cadmium. From a practical standpoint, such salts as the following may be suggested: Ferric sulfate, potassium antimony tartrate, sodium arsenate, cobalt sulfate, copper sulfate, nickel sulfate, cadmium sulfate and zinc sulfate. Zinc is mentioned for its addition to a new solution helps the coating action get started. Any of these metal salts may be substituted in the above examples for ferric sulfate in the same proportions except in the case of antimony and copper where all that is needed is 0.05 to 0.1% potassium antimony tartrate or 0.525% copper sulfate, or less.

Both the oxidizing agent and the metal accelerator may be added in the same compound such as by making use of nickel nitrate, copper nitrate or cobalt nitrate.

The solutions used in this invention may be applied to the metal surface in any convenient way such as by the immersion method whereby the articles to be coated are submerged in the solution until action is complete; spraying by means of a mechanical spraying machine wherein the solution is sprayed onto the surface to be coated, drained off, collected and resprayed; or by making use of an ordinary compressed air spray gun which sprays a thin film of solution onto the surface to be coated, both with and without a finely divided inert material to hold the solution in place until the reaction is complete.

Coatings on zinc obtained from the various combinations provided for herein are of three different types. The first is a magnetic oxide coating such as is produced from a solution containing a ferric salt and an oxidizing agent with the acid, such as a solution of citric acid, ferric sulfate and sodium nitrate, used at room temperature. The second is a zinc oxide coating with the basic salt of the metal in the accelerator such as is produced in a solution containing acetic acid, ferric sulfate and sodium nitrate when used at room temperature where a basic ferric sulfate is formed. The third is the organic salt of zinc such as is produced in a solution of citric acid, ferric sulfate and sodium nitrate when used at boiling temperature.

A method of producing the first type of coating specified above is disclosed more broadly and claimed in the copending application of John S. Thompson, Serial No. 390,337, filed April 25, 1941, and the same is claimed herein only as specifically produced by the organic acids specified herein.

It has been further discovered that when coatings produced in accordance with this invention are subjected to a final rinse in a solution of the kind described below, the corrosion resistance is still further enhanced, and the defect of blistering of paints and the like is reduced to a minimum. For this purpose a dilute solution of chromic acid, phosphoric acid, oxalic acid or a salt of iron, chromium or aluminum may be used, such as aluminum nitrate or sulfate, ferrous sulfate, ferric nitrate and chromic nitrate or sulfate. The solutions may be used from room temperature up to boiling but where chromic acid is used it is preferable to use it at room temperature or slightly above as it tends to react with organic salt coatings at the higher temperatures.

From 2 to 6 grams of the acid or salt per gallon is the preferred strength from the standpoint of economy, although stronger solutions may be used to advantage. A treatment of one minute in the solution is sufficient.

The above detailed description is given with the intention of illustrating the invention, the scope of which is to be determined from the appended claims.

What we claim is:

1. A method of chemically coating zinc surfaces which consists in subjecting said surfaces to the action of a solution composed principally of an acid of the group consisting of the aromatic series of acids having two carboxyl groups, the mono-carboxylic acids of the aliphatic series, the tri-carboxylic acids of the aliphatic series, and the hydroxy mono-carboxylic acids of the aliphatic series until a visible protective coating is obtained on the zinc surfaces.

2. A method of chemically coating zinc surfaces which comprises subjecting said surfaces to the action of a solution composed principally of an acid of the group consisting of the aromatic series of acids having two carboxyl groups, the mono-carboxylic acids of the aliphatic series, the tri-carboxylic acids of the aliphatic series, and the hydroxy mono-carboxylic acids of the aliphatic series, and containing a metal accelerator in the form of a soluble compound of a metal being one of the group of iron, antimony, arsenic, zinc, cobalt, copper, nickel and cadmium until a visible protective coating is obtained on the zinc surfaces.

3. A method of chemically coating zinc surfaces which comprises subjecting said surfaces to the action of a solution composed principally of an acid of the group consisting of the aromatic series of acids having two carboxyl groups, the mono-carboxylic acids of the aliphatic series, the tri-carboxylic acids of the aliphatic series, and the hydroxy mono-carboxylic acids of the aliphatic series, and containing an oxidizing agent which does not readily oxidize the acid used until a visible protective coating is obtained on the zinc surfaces.

4. A method of chemically coating zinc surfaces which comprises subjecting said surfaces to the action of a solution containing an acid of the group consisting of the aromatic series of acids having two carboxyl groups, the mono-carboxylic acids of the aliphatic series, the tri-carboxylic acids of the aliphatic series, and the hydroxy mono-carboxylic acids of the aliphatic series; an oxidizing agent chosen from the group consisting of nitrates, nitrites and bromates, and a metal accelerator chosen from the group of iron, antimony, arsenic, zinc, cobalt, copper, nickel and cadmium until a visible protective coating is obtained on the zinc surfaces.

5. An article having a surface of zinc, such surface having a coating imparted thereto by the action of a solution composed principally of an acid of the group consisting of the aromatic series of acids having two carboxyl groups, the mono-carboxylic acids of the aliphatic series, the tri-carboxylic acids of the aliphatic series, and the hydroxy mono-carboxylic acids of the aliphatic series.

6. An article having a surface of zinc, such surface having a coating imparted thereto by the action of a solution composed principally of an acid of the group consisting of the aromatic series of acids having two carboxyl groups, the mono-carboxylic acids of the aliphatic series, the tri-carboxylic acids of the aliphatic series, and the hydroxy mono-carboxylic acids of the aliphatic series, and a metal accelerator in the form of a soluble compound of a metal being one of the group of iron, antimony, arsenic, zinc, cobalt, copper, nickel and cadmium.

7. An article having a surface of zinc, such surface having a coating imparted thereto by the action of a solution composed principally of an acid of the group consisting of the aromatic series of acids having two carboxyl groups, the mono-carboxylic acids of the aliphatic series, the tri-carboxylic acids of the aliphatic series, and the hydroxy mono-carboxylic acids of the aliphatic series, and containing an oxidizing agent which does not readily oxidize the acid used.

8. An article having a surface of zinc, such surface having a coating imparted thereto by the action of a solution composed principally of an acid of the group consisting of the aromatic series of acids having two carboxyl groups, the mono-carboxylic acids of the aliphatic series, the tri-carboxylic acids of the aliphatic series, and the hydroxy mono-carboxylic acids of the aliphatic series, and containing an oxidizing agent chosen from the group consisting of nitrates, nitrites and bromates, and a metal accelerator chosen from the group of iron, antimony, arsenic, zinc, cobalt, copper, nickel and cadmium.

9. A method of chemically coating zinc surfaces which comprises subjecting said surfaces to the action of a solution containing as a main coating chemical one of the group consisting of phthalic, formic, acetic, propionic, citric, glycollic and mandelic acids and containing a metal accelerator in the form of a soluble compound of a metal being one of the group of iron, antimony, arsenic, zinc, cobalt, copper, nickel and cadmium until a visible protective coating is obtained on the zinc surface.

10. A method of chemically coating zinc surfaces which comprises subjecting said surfaces to the action of a solution containing an acid as a main coating chemical of the group consisting of phthalic, formic, acetic, propionic, citric, glycollic and mandelic and containing an oxidizing agent which does not readily oxidize the acid used until a visible protective coating is obtained on the zinc surface.

11. A method of chemically coating zinc surfaces which comprises subjecting said surfaces to the action of a solution containing an acid of the group consisting of phthalic, formic, acetic, propionic, citric, glycollic and mandelic, an oxidizing agent chosen from the group consisting of nitrates, nitrites and bromates, and a metal accelerator chosen from the group of iron, antimony, arsenic, zinc, cobalt, copper, nickel and cadmium until a visible protective coating is obtained on the zinc surface.

12. An article having a surface of zinc, such surface having a coating imparted thereto by the action of a solution composed principally of an acid of the group consisting of the aromatic series of acids having two corboxyl groups, the mono-carboxylic acids of the aliphatic series, the tri-carboxylic acids of the aliphatic series, and the hydroxy mono-carboxylic acids of the aliphatic series, and containing an oxidizing agent which does not readily oxidize the acid used, and a metal accelerator chosen from the group of iron, antimony, arsenic, zinc, cobalt, copper, nickel and cadmium.

13. An article in accordance with claim 12 and wherein the coating contains as an essential ingredient, magnetic oxide formed at substantially room temperature in a solution containing a ferric salt as a metal accelerator.

14. An article in accordance with claim 12 and wherein the coating contains as an essential ingredient, a basic salt of the metal accelerator.

15. An article in accordance with claim 12 and wherein the coating consists principally of an organic salt of zinc.

JOHN S. THOMPSON.
EDWARD S. HANSON.